Jan. 4, 1927.
O. W. THOMPSON
LAWN RAKE
Filed August 11, 1926
1,612,894
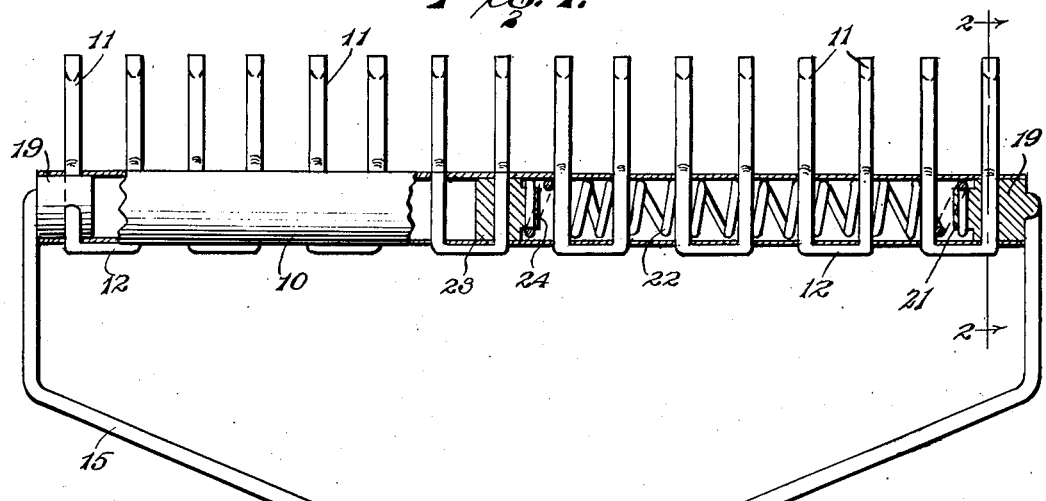
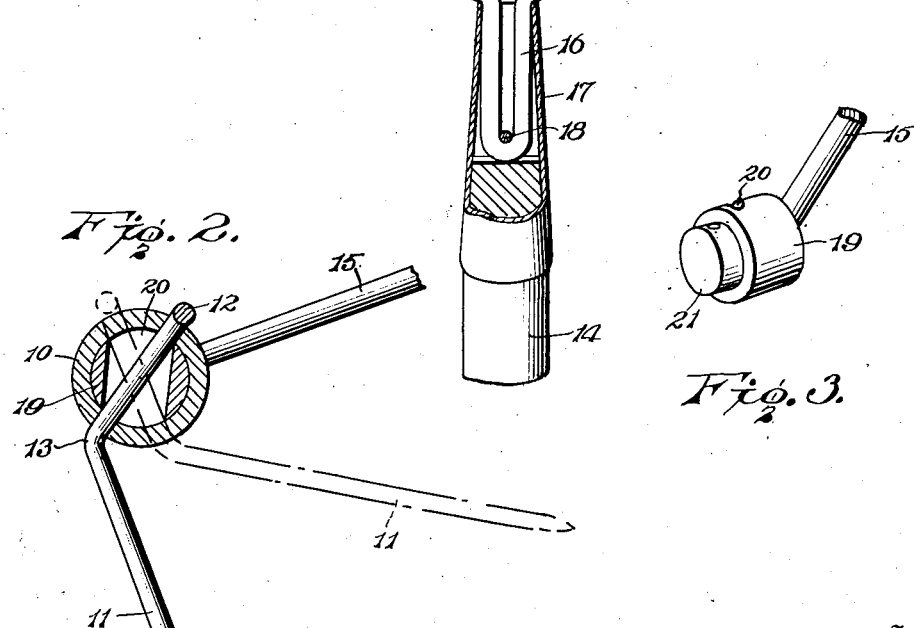
Inventor
O. W. Thompson
By Lacey & Lacey, Attorneys Patented Jan. 4, 1927.

1,612,894

UNITED STATES PATENT OFFICE.

OTTO W. THOMPSON, OF CHICAGO, ILLINOIS.

LAWN RAKE.

Application filed August 11, 1926. Serial No. 128,632.

The object of this invention is the provision of a lawn rake which will automatically clear itself of trash by a reverse movement.

The invention furthermore provides a rake of the character aforesaid embodying a few number of parts which may be easily and conveniently assembled and which are not susceptible to ready derangement.

A further purpose of the invention is the provision of a rake which will operate effectively by simply pushing the implement from and drawing it towards the operator, without the necessity of lifting the same at each stroke.

The invention contemplates a pivoted rake head and a cooperating coil spring to normally hold the rake teeth perpendicular to the handle, said coil spring being completely housed within the rake head and connected at one end thereto and at its opposite end to the handle.

While the drawings illustrate a preferred embodiment of the invention, it is to be understood that in adapting the means to meet specific needs and requirements, the design may be varied and such other changes in the minor details of construction may be resorted to within the scope of the invention as claimed, without departing from the spirit thereof.

For a full understanding of the invention and the merits thereof, reference is to be had to the following description and the drawings hereto attached, in which,—

Figure 1 is a top plan view of the head portion of a lawn rake embodying the invention, parts being in section.

Figure 2 is an enlarged sectional view on the line 2—2 of Figure 1, looking in the direction of the arrows, the full lines showing the normal operative position of the teeth and the dotted lines indicating the position of the teeth when sliding over the ground when pushing the rake, and Figure 3 is a detail perspective view of an end portion of the bail provided with the reduced journal.

Corresponding and like parts are referred to in the following description and designated in the several views of the drawings by like reference characters.

The rake comprises a head 10 which is preferably of tubular form and provided in its length with teeth 11. The teeth are provided in pairs, each pair of teeth consisting of a length of stout wire doubled upon itself in the form of a hair-pin or loop, the legs of which constitute a pair of teeth. The cross piece 12 connecting the teeth of each pair engages a side of the head 10 and the bend 13 formed by deflecting the teeth engages the opposite side of the head 10, thereby holding the teeth in place.

The numeral 14 designates the handle which includes a bail 15 formed with a shank 16. The end of the handle 14 is slotted to receive the shank 16, a ferrule 17 being forced over the slotted end of the handle to reinforce the same and close the sides of the slot.

A pin 18 passing through the ferrule, shank and handle retains the parts in place. The shank 16 is preferably in the form of a loop and is prevented from turning in the slot of the handle. The pin 18 engages the closed end of the loop to prevent any outward movement of the bail. The ends of the bail are provided with inwardly disposed journals 19 which enter the ends of the rake head 10. Each of the journals 19 is formed with a transverse slot 20 to receive a tooth 11. In this manner the head 10 is held in place and its pivotal movements limited. The width of the transverse slots 20 corresponds to the diameter of that portion of the teeth passing through the slots and through registering openings formed in opposite sides of the head 10, so that endwise movement of the rake head is prevented while the same has a limited rotary movement to admit of the teeth sliding over the ground and automatically clearing themselves of trash when the rake is pushed.

One of the journals has its inner end reduced, as indicated at 21, and formed with a transverse opening to receive the end of a coil spring 22 located within the rake head 10. A plug 23 is secured within the head 10 by means of one of the teeth 11 which passes through an opening formed therein and registering openings formed in opposite sides of the head 10. This plug 23 has the end facing the spring 22 reduced, as indicated at 24, and transversely apertured to receive the inner end of the spring 22. In this manner the spring 22 is secured both to the rake head 10 and the handle and normally operates to hold the teeth perpendicular to the handle so as to perform work when the rake is drawn towards the operator. When the rake is pushed away from the operator, the teeth 11 turn and slide over the ground with the result that any matter clinging to the teeth is removed so that the rake is automatic in clearing itself of trash when receiving a reverse movement.

Having thus described the invention, I claim:

1. A rake adapted to automatically clear itself of trash, the same comprising a bail having journals, a tubular rake head mounted upon the journals of the bail and provided with teeth, one of the journals of the bail having its inner end reduced and provided with a transverse opening, and both journals having transverse slots to receive the end teeth of the rake to hold the parts assembled and limit the rotation of the rake head in each direction, and a coil spring within the rake head and connected at its outer end to the reduced end of the journal and having connection at its inner end with the rake head and serving to normally hold the teeth of the rake in operative position.

2. A self-cleaning rake comprising a bail, provided at its ends with inwardly disposed journals, in which are formed transverse slots, one of the journals having its inner end reduced, a tubular rake head mounted upon the journals and provided with teeth, the end teeth passing through the slots of the journals to retain the parts assembled and limit the rotary movements of the rake head, a coil spring within the rake head and secured at its outer end to the reduced end of the journal, and a plug secured within the rake head by a tooth thereof, and having the end facing the coil spring reduced, and secured thereto.

3. A rake comprising a bail provided with a shank and having inwardly disposed journals at its ends, a tubular rake head mounted on the journals and provided with teeth, means for limiting the rotation of the rake head, a coil spring within the rake head and having connection at one end therewith and at its opposite end with one of the said journals, and a handle secured to the shank of the bail.

In testimony whereof I affix my signature.

OTTO W. THOMPSON. [L. S.]